July 6, 1943.  O. R. SCHOENROCK  2,323,682
WHEEL MOUNTING FOR TRACTORS
Filed Aug. 15, 1940  2 Sheets-Sheet 1
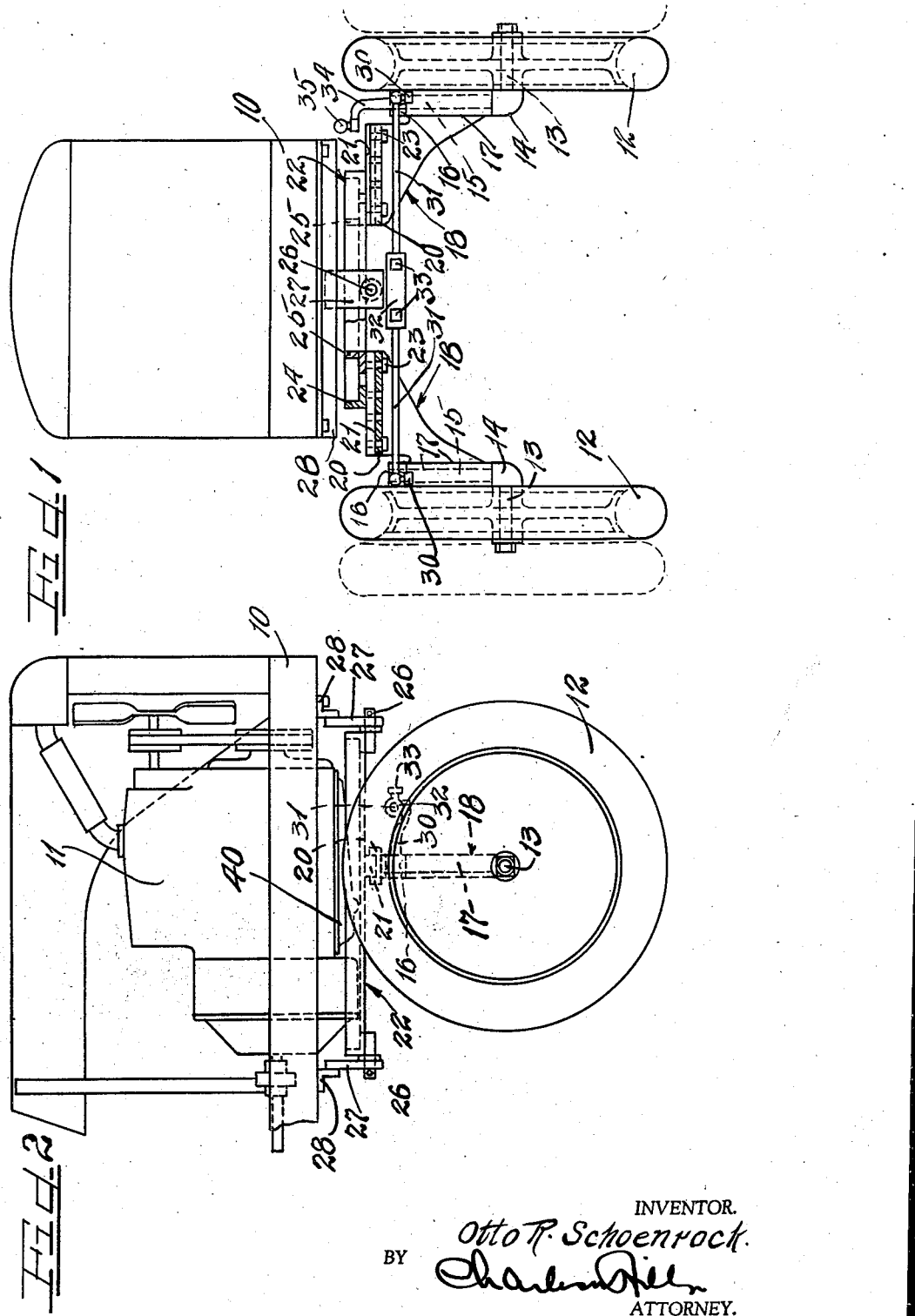
INVENTOR.
Otto R. Schoenrock
BY
ATTORNEY.

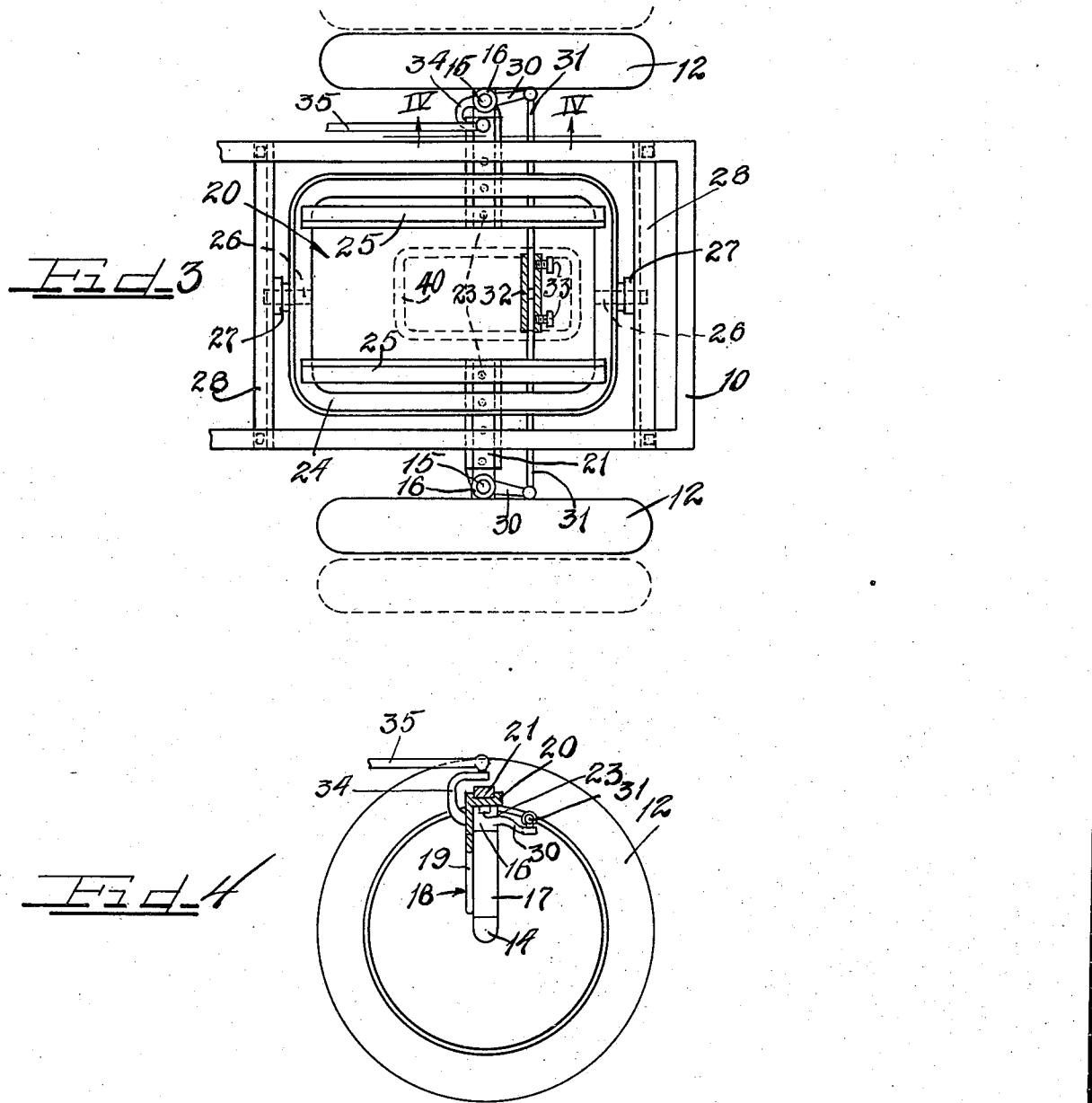

Patented July 6, 1943

2,323,682

UNITED STATES PATENT OFFICE 2,323,682

WHEEL MOUNTING FOR TRACTORS

Otto R. Schoenrock, Chicago, Ill.

Application August 15, 1940, Serial No. 352,702

3 Claims. (Cl. 180—64)

This invention relates to steerable wheels for self-propelled vehicles, and more particularly to a steerable wheel assembly especially adapted for use in tractors.

An object of this invention is to provide an improved steerable wheel assembly for a self-propelled vehicle.

Another object of this invention is to provide a steerable wheel structure for tractors which provides for relatively high ground clearance, as well as for a lower center of gravity where the prime mover is supported directly above the steerable wheel.

A further object of the invention is to provide a vehicle axle structure especially adapted for use with steerable wheels and wherein provision is made for the transverse adjustment of the steerable wheels so as to vary the spacing between them.

Still another object of this invention is to provide transversely adjustable steerable wheels in a tractor whereby the space between the wheels may be varied and the wheels may, if it is so desired, be aligned longitudinally with the other wheels of the tractor. This arrangement is particularly advantageous where, as for example in plowing, it is desirable to have the front and rear wheels longitudinally aligned for movement through two parallel grooves between the rows being plowed.

In accordance with the general features of this invention, there is provided in a vehicle axle structure expecially adapted for use with steerable wheels of a tractor and the like a pair of aligned and spaced axle sections each adapted to carry a steerable wheel and connected to the frame of the vehicle by a support having an opening between the sections and into which a portion of the vehicle prime mover is adapted to extend downwardly below the uppermost plane of the supporting means of the axle sections. The opening also permits ready removal of the engine oil pan.

Another feature of the invention relates to the provision of mechanism for longitudinally adjusting a pair of spaced and aligned steerable wheel axle sections, as well as means for adjusting the tie rod structure to enable the same to be lengthened and shortened in accordance with the adjusted spacing between the wheels.

Still other features of the invention relate to the provision of a novel pivotal structure, having an axial section in cooperation therewith, for pivotally connecting a steerable wheel of a vehicle to a sub-frame below the main frame of the vehicle.

Other objects and features of this invention will more fully appear from the following detailed description taken in connection with the accompanying drawings which illustrate a single embodiment thereof, and in which:

Figure 1 is an end view of a vehicle or tractor embodying the features of this invention and showing in dotted lines how the steerable wheels may be transversely moved apart to vary the spacing between them;

Figure 2 is a fragmentary side view of the structure shown in Figure 1 and illustrating clearly the arrangement of the steerable wheel supporting means with respect to the bottom portion of an engine or prime mover;

Figure 3 is a plan view of the structure shown in Figure 2 and illustrating in dotted lines how the steerable wheels may be transversely adjusted to vary the spacing between them; and Figure 4 is a fragmentary sectional view taken on the line IV—IV of Figure 3 looking in the direction indicated by the arrows and showing the manner in which the drag link and tie rod mechanism is associated with the axle section on which the steerable wheel is carried.

As shown on the drawings:

The reference character 10 designates generally the frame of a vehicle such as a tractor, on which frame is mounted in the usual way the prime mover or engine 11 disposed at one end of the frame which is usually the front end of the tractor.

Positioned below the engine 11 are a pair of spaced steerable wheels 12—12, which may be of any usual or suitable construction. Each of these wheels is mounted on a horizontal spindle 13 which is connected at its inner side to a kunckle 14 in which is secured the lower end of a vertically extending pintle or king pin 15, shown in dotted lines in Figure 1. The upper end of the pintle or king pin 15 has mounted and secured to it a steering knuckle 16 which it will be noted is spaced from the knuckle 14 by a tubular axle end 17 comprising part of an axle section designated generally by the reference numeral 18.

The two axle sections 18—18 as will become more fully apparent with the progress of this description, are adjustably spaced apart so as to enable varying of the distance separating the two steerable wheels 12—12. That is to say, by adjusting the positions of the axle sections 18—18 it is possible, for example, to move the steerable wheels 12—12 outwardly and apart to the dotted line positions shown in Figures 1 and 3.

In addition to the tubular end 17, each of the axle sections 18—18 includes an upwardly extending web portion 19 terminating at its upper end in a horizontally extending channeled member 20. The cross sectional shape of this channeled member 20 is illustrated in Figures 2 and 4. Positioned in the channel of this member 20 is a fixedly supported horizontally extending member 21 mounted on a sub-frame structure designated generally by the reference character 22. It will be noted from Figures 1 and 3 that each of the members 20 and 21 has a plurality of spaced bolt apertures which are adapted to be adjustably and selectively brought into register as desired and after this adjustment are adapted to be secured together by means of bolts 23 (Figure 1). In other words, by detaching the bolts 23 and sliding the axle section 18 together with its associated steerable wheel 12 along the member 21 it is possible to vary the distance separating the two steerable wheels 12—12, and after the desired adjustment of the wheels has been effected, the member 20 of the axle section 18 can be bolted to the cooperating member 21 by means of the bolts or cap screws 23. If desired, the member 21 may comprise a single member extending entirely across the structure.

The sub-frame 22 comprises a rectangular shaped iron frame 24 rounded at the corners and having two spaced longitudinally extending reenforcing angle irons 25—25.

The transversely extending members 21—21 are suitably anchored to the longitudinally extending legs of the frame 24, as well as to the reenforcing angle irons, as best shown in Figures 1 and 3. Thus, the spaced members 21—21, which cooperate with the channel portions of the adjustable members 20—20 of the axle sections, are rigidly attached to and in reality comprise a part of the sub-frame 22.

The end portions of the sub-frame member 24 have secured to them aligned pintle pins 26—26 which are, in turn, pivotally journalled in downwardly extending arms 27—27 (Figures 2 and 3) anchored to members 28—28 extending transversely of and below the vehicle frame 10. These members 28—28 may be in the form of rigid angle irons or may comprise leaf springs if it is desired to suspend the steerable wheel assembly from the main frame 10 by means of springs. This arrangement is such that the entire steerable wheel assembly is pivotally connected to the lower portion of the vehicle frame 10 in such a manner that the steering wheel assembly may be pivoted as a unit at right angles to the longitudinal axis of the vehicle or tractor.

Inasmuch as the steerable wheels 12—12 are adjustable to and from each other, it is also necessary to provide in the steering mechanism an adjustment to take care of these variations. I shall now proceed to describe the steering mechanism whereby the spaced wheels 12—12 may be turned or manipulated together in their operation.

Each of the knuckles 16 has formed as an integral part thereof a tie rod arm 30 to the free end of which is pivotally connected one end of a tie rod section 31. The two tie rod sections 31—31, as shown in Figures 1 and 3, are aligned with each other and have their adjoining ends mounted in an adjustment block 32 in which the free ends of the tie rod sections 31—31 are slideably disposed. After the wheels and the tie rod sections have been adjusted, set screws 33 in the tie rod block 32 are tightened so as to firmly secure the free ends of the tie rod sections 31—31 to the block 32. When thus secured, the block 32 and the two sections 31—31 function together as a single unit or, in other words, as a tie rod for connecting the steering knuckles 16—16 of the two wheels together.

One of the steering knuckles 16, as best shown in Figures 1, 3, and 4, also has attached to it a drag link arm 34, to the free end of which is pivotally connected a conventional drag link 35 which, as is well known, is connected to the steering wheel of the vehicle.

From the foregoing, it is apparent that when it is desired to change the space separating the steerable wheels 12—12, the adjustment may be effected by removing the bolts 23 and by loosening the set screws 33. Thereafter, the axle sections, together with the wheels, are slid transversely relative to the spaced members 21—21 until they have been adjusted with the desired spacing. Then the bolts 23 are inserted in aligned apertures in the two members 21—21 and upon tightening they clamp these two members together. After this adjustment, the set screws 33 can be tightened so as to tighten the tie rod sections to the block 32 and thus secure them together as a single unit.

Also, in the movement of the vehicle over the ground, the wheels can pivot together transversely to the axis of the vehicle by reason of the pivotal support provided at the pintle pins 26—26 and the arms 27—27.

In addition to the foregoing, by reason of the fact that the axle sections 18—18 slope upwardly away from the king pins 15 to and toward the members 21—21, a very high ground clearance is provided in the space separating the wheels.

A still further advantage of the construction described hereinabove resides in the fact that the sub-frame 22 is hollow at its center as shown in Figure 3, and as a consequence the lower portion of the prime mover or engine designated by the reference character 40 in Figure 2 may extend downwardly into the central opening of the sub-frame. In Figure 3, I have illustrated in dotted lines the position of the portion 40 with respect to the reenforcing members 25—25 of the sub-frame 22. As shown in Figure 2, the portion 40 at the bottom of the engine 11 extends downwardly below the uppermost plane of the sub-frame structure 22.

An advantage of this feature is the fact that a lower center of gravity is enabled than would be the case if the engine was mounted entirely above the entire steerable wheel assembly.

Another advantage resides in the fact that the engine oil pan may be removed through the opening in the sub-frame, ready access to engine bearings, etc., being thus permitted.

I claim:

1. In combination in a self-propelled vehicle such as a tractor or the like, having a prime mover and a frame structure, a supporting assembly for the prime mover, a pair of spaced and aligned steerable wheels below said prime mover, means for operatively securing said wheels to the vehicle including spaced elements connected with the frame, means for securing said supporting assembly to the frame, said supporting assembly including spaced members adapted to receive the lower portion of the prime mover therebetween, said spaced elements with spaced members defining an opening beneath the frame in the vicinity of the prime mover whereby the vehicle is provided with a relatively low center of gravity and increased ground clearance.

2. In combination in a self-propelled vehicle such as a tractor and the like, a prime mover therefor, a frame supporting the prime mover, a pair of spaced and aligned steerable wheels below said prime mover, spaced axle sections supporting said wheels, and means connecting said sections to said vehicle frame and being constructed and arranged to provide an opening between said sections into which the lower portion of said prime mover extends downwardly below the uppermost plane of said connecting means so as to provide the vehicle with a relatively low center of gravity, said connecting means including a sub-frame extending in the direction of the length of the vehicle and having its ends pivotally supported by aligned arms from said vehicle frame.

3. In a vehicle such as a tractor having a main frame, steerable wheels and a prime mover disposed thereover, a pair of aligned and spaced axle sections each adapted to carry a steerable wheel, means for supporting said wheels and said prime mover including a sub-frame having means disposed transversely of the vehicle to support the axle sections and a support for the prime mover, said transverse means being secured to said support for sliding movement relative thereto, and means for securing said sub-frame to the main frame.

OTTO R. SCHOENROCK.